Patented Aug. 7, 1928.

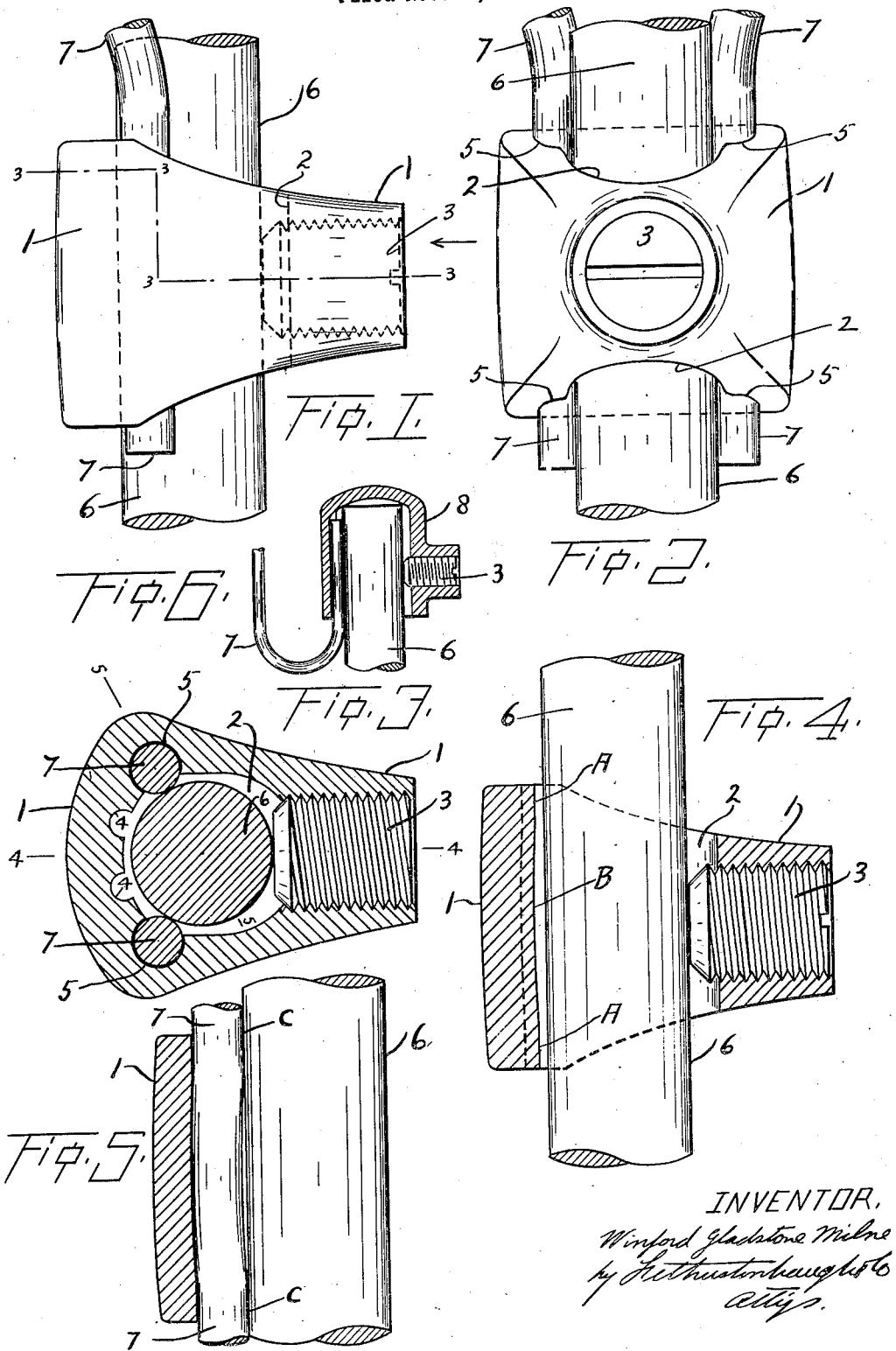

1,679,677

UNITED STATES PATENT OFFICE.

WINFORD GLADSTONE MILNE, OF HAMILTON, ONTARIO, CANADA, ASSIGNOR TO THE N. SLATER COMPANY, LIMITED, OF HAMILTON, CANADA.

GROUND-WIRE CONNECTER.

Application filed November 21, 1925. Serial No. 70,598.

My invention relates to improvements in ground wire connecters and the object of the invention is to devise an improved device for connecting ground wires to ground rods whereby a very secure and reliable mechanical connection may be assured together with a very efficient electrical connection whereby the resistance at the connection will be reduced to a minimum; a further object is to provide a connecter of simple, inexpensive though strong construction, by means of which the operation of connecting the ground wire to the ground rod will be rendered extremely simple thus reducing the labor cost of erection; a further object is to provide for the easy disconnecting of the ground wire from the ground rod for inspection or other reasons and the ready connecting thereto again without involving undue labor or trouble; and a still further object is to provide for the connection of a number of ground wires to a single ground rod by means of a common connecter, in such a manner that all ground wires will be connected with equal security.

Other objects will appear in the course of the following specification.

My invention consists in the construction and arrangement of parts, all as hereinafter more particularly described and illustrated in the accompanying drawings in which:—

Fig. 1 is a side elevation of a portion of a ground rod and ground wires connected thereto by means of my improved connecter.

Fig. 2 is a view of Fig. 1 looking in the direction of the arrow.

Fig. 3 is a section taken on the staggered line 3—3—3—3 of Fig. 1.

Fig. 4 is a section on the line 4—4 of Fig. 3.

Fig. 5 is a fragmentary section taken on the line 5—5 of Fig. 3, the ground wire and ground rod not being in section.

Fig. 6 is a sectional view to a reduced scale showing a modified form in which my invention may be made.

In the drawings, like characters of reference indicate corresponding parts in the various views.

In the form illustrated in Figs. 1 to 5 inclusive, my improved connecter is in the nature of a clamp comprising a body portion 1 having an orifice 2 extending from top to bottom therethrough.

Extending inwardly from one side of the body portion is a screw 3 adapted to project into the orifice 2.

The wall of the orifice 2 at the side thereof remote from the screw 3 is formed with wire receiving recesses 4 and 5 extending longitudinally of the orifice.

There are four of these recesses, the two larger recesses 5 being of similar dimensions and being on the outside of the smaller recesses 4 which latter are also of similar dimensions.

The recesses are disposed symmetrically with respect to the screw 3.

Adjacent to each end, the recesses 4 and 5 are straight longitudinally (see at A in Fig. 4) and the central portion of each recess is concave longitudinally (see at B in Fig. 4).

A portion of a ground rod is indicated by the numeral 6 and two ground wires connected thereto by the numerals 7.

The manner of employing my connecter is as follows:—

The clamp passes freely over the ground rod so that the rod extends loosely into the orifice 2.

The ground wires 7 are simply passed into the recesses 5, which recesses, since they extend the full depth of the clamp form guides for properly directing the ground wires therethrough.

The recesses are of arc-shaped cross-section and the depth thereof is less than the diameter of the wire 7 so that a portion of the circumference of the wire projects into the orifice 2.

Upon tightening the screw 3 it will be apparent that the wires will be very securely forced against the surface of the ground rod 6 so as to give an electrical connection in which the resistance at the connection will be a minimum due to the perfect connection between the ground wire and ground rod and since the recesses 7 are disposed symmetrically on either side of the screw 3 the pressure will be equally distributed upon each wire.

The device as will be apparent from Fig. 3 gives a three point contact consisting of the two ground wires 7 contacting with the rod and the screw 3 contacting with the rod.

In order to further insure a perfect mechanical connection of the ground wire with the ground rod, the recesses 4 and 5 are made straight longitudinally for a portion adjacent to each end thereof and the central portion of each recess is concave longitudinally.

By this means it is insured that the ground wire will be gripped at a plurality of separate spaced apart points (see at "C" in Fig. 5).

In the illustrations, ground wires 7 are shown connected in the outer recesses 5 but smaller wires could be connected in the same manner in the inner recesses 4.

In the modified form illustrated in Fig. 6 the operation is practically the same as above described except that the clamp is made in the form of a cap the top of which forms a protection against the weather and will shield the connection from dirt and foreign matter.

In Fig. 5 the clamp is indicated by the numeral 8 and the other parts are numbered as in the other figures of the drawings.

My improved connecter will be of particular value when used with a copper jacketed ground rod as due to the very intimate contact between the ground wire and ground rod the electrical resistance at the contact will be very low.

By the use of my connecter a very secure and reliable mechanical connection is obtained and also the operation of connecting the ground wires to the ground rod is very simple and may be rapidly performed thus reducing the cost of erection.

A further and important feature of the invention is that the wires may be quickly and easily disconnected from the ground rod to permit of inspection and examination without in any way injuring the connecter and the connection may be very quickly and easily made again.

Another feature of my invention is that it will permit of a plurality of ground wires being connected to a ground rod by a common connecter.

While I have shown a form of connecter using only one screw 3 it will be obvious that the body portion 1 could be elongated and a number of screws used and it is not therefore thought necessary to illustrate this form.

While I have particularly referred to the application of my invention to ground rods it will be equally adaptable to any similar devices in which it is desired to provide this type of connection.

From the foregoing it will be apparent that I have devised valuable improvements in ground wire connecters of the class described whereby the objects of my invention have been attained.

Various modifications may be made in my invention without departing from the spirit thereof or the scope of the claim and therefore the exact forms shown are to be taken as illustrative only and not in a limiting sense and I desire that only such limitations shall be placed thereon as are imposed by the prior art or are specifically set forth in the appended claim.

What I claim as my invention is:

In a ground wire connecter, the combination with a ground rod and a ground wire to be connected therewith, of a clamp comprising a body portion having an orifice extending thereinto, into which the ground rod is adapted to loosely extend, a screw extending through one side of the body portion and adapted to project into said orifice to engage the ground rod, the axis of said screw being perpendicular to the axis of the aforementioned orifice, the wall of the orifice at the side remote from the screw formed with a longitudinal recess adapted to receive the ground wire, the depth of said recess being less than the diameter of the ground wire, said recess being straight longitudinally adjacent to each end thereof and concave longitudinally over the central portion of its length.

WINFORD GLADSTONE MILNE.